July 2, 1929.  T. M. DAVIDSON  1,719,171
APPARATUS FOR SEPARATING MINERALS AND OTHER SUBSTANCES
Filed Nov. 2, 1925  7 Sheets-Sheet 7

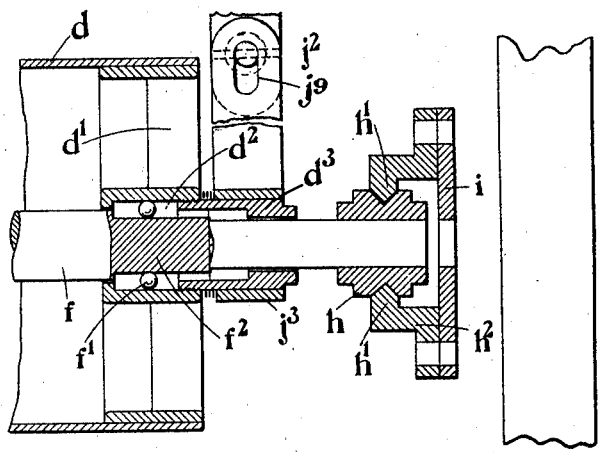
Fig. 5.
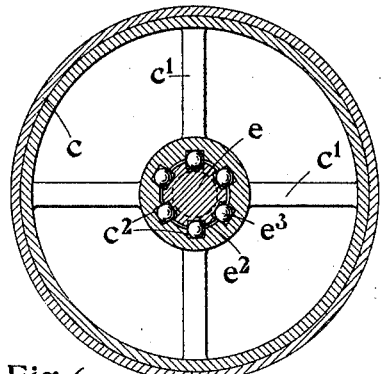
Fig. 6.
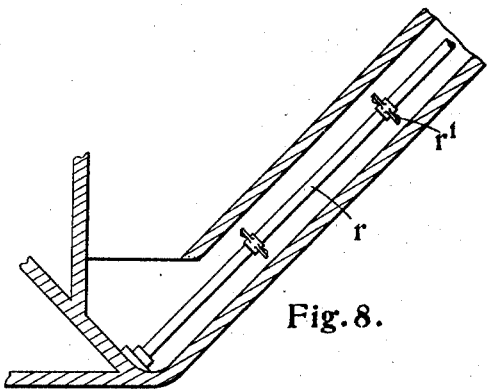
Fig. 8.
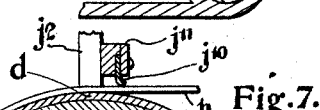
Fig. 7.
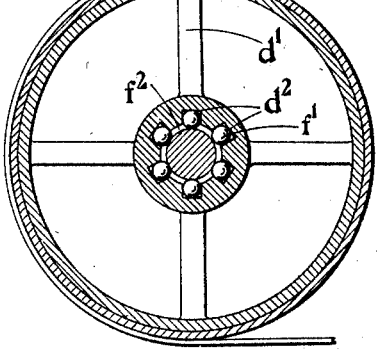

*Inventor*
T. M. Davidson
by
U. S. Evans
*Attorney.*

Patented July 2, 1929.

1,719,171

UNITED STATES PATENT OFFICE.

THOMAS MALCOLM DAVIDSON, OF HATCH END, ENGLAND.

APPARATUS FOR SEPARATING MINERALS AND OTHER SUBSTANCES.

Application filed November 2, 1925, Serial No. 66,412, and in Great Britain January 1, 1925.

This invention relates to the washing and separation of minerals and other substances, whereby separation is effected according to the relative specific gravity of the mineral and the gangue, dirt or foreign matter associated with it.

The invention has special utility in the washing and separation of coal for the reduction of its content of ash by washing and for the separation of the heavier foreign bodies commonly associated with it, such as pyrites, shale, sand and stone, and the invention has among its objects to effect a substantially complete separation of the mineral in a simple operation that does not involve the use of an extensive or expensive apparatus.

According to the invention, in the treatment of minerals and other substances for washing, separation or the like, the substance under treatment, advantageously in a reduced or finely divided condition, is fed to an inclined surface submerged in water or other liquid and having a forward and upward movement in the direction of its inclination and a transverse reciprocation, the substance being deposited upon the said surface at a point where the water or other liquid is in an undisturbed or still condition.

According to the invention an endless conveyor, whose supporting or upper surface is inclined, is disposed within a tank filled with water or other liquid to a level such that the conveyor is wholly or almost wholly submerged, and the conveyor is reciprocated in a direction transverse to its supporting or upper surface which is moved in the upward direction. The mineral or coal to be separated, and which is advantageously in a reduced or finely divided condition, is fed to the conveyor at a point where it is submerged in the water or other liquid in the tank, and where the water or other liquid is in an undisturbed or still condition and upon the particles of different specific gravities falling upon the supporting or upper surface of the conveyor the heavier particles come to rest and are carried upwardly on the conveyor, while the lighter particles are maintained in motion by the transverse movement of the conveyor and travel downwards.

According to the invention, moreover, the mineral or coal to be separated is advantageously delivered to the conveyor by an inclined shoot which is submerged or partly submerged or has its outlet submerged in the water or other liquid and may be reciprocated in the transverse direction, so that the particles of different specific gravities in moving down the shoot are prepared for separation. The transverse reciprocation of the shoot may be effected by or from the mechanism by which such movement is given to the conveyor or by a distinct mechanism.

The desired movement and separation of the particles of different specific gravities are effected by the proper determination of the inclination of the supporting or upper surface of the conveyor and, where a reciprocated shoot is employed, also of the shoot, and means are provided for permitting the adjustment of inclination of the conveyor, and, where necessary, of the shoot, according to the character of the material to be separated and the relative specific gravities of its constituents.

Baffles or the like are advantageously disposed in transverse positions above the supporting or upper surface of the conveyor in order to effect or assist in effecting the settlement upon the said surface of fine materials which may tend to remain suspended in or to float upon the water or other liquid and to prevent disturbance of the water or other liquid.

Means are further provided to effect the removal of the separated heavy and light particles in such manner that the water or other liquid in the tank is not disturbed, so that the heavy and light particles may settle upon the supporting or upper surface under still water conditions in order that the separation may be completely effective.

The invention comprises the features of apparatus hereinafter described.

A separating apparatus provided according to the invention is illustrated in the accompanying diagrammatic drawings.

Figure 1 is a sectional elevation of the apparatus.

Figure 1ª is detail view on an enlarged scale of the means employed for adjusting the level of the weir.

Figure 3:
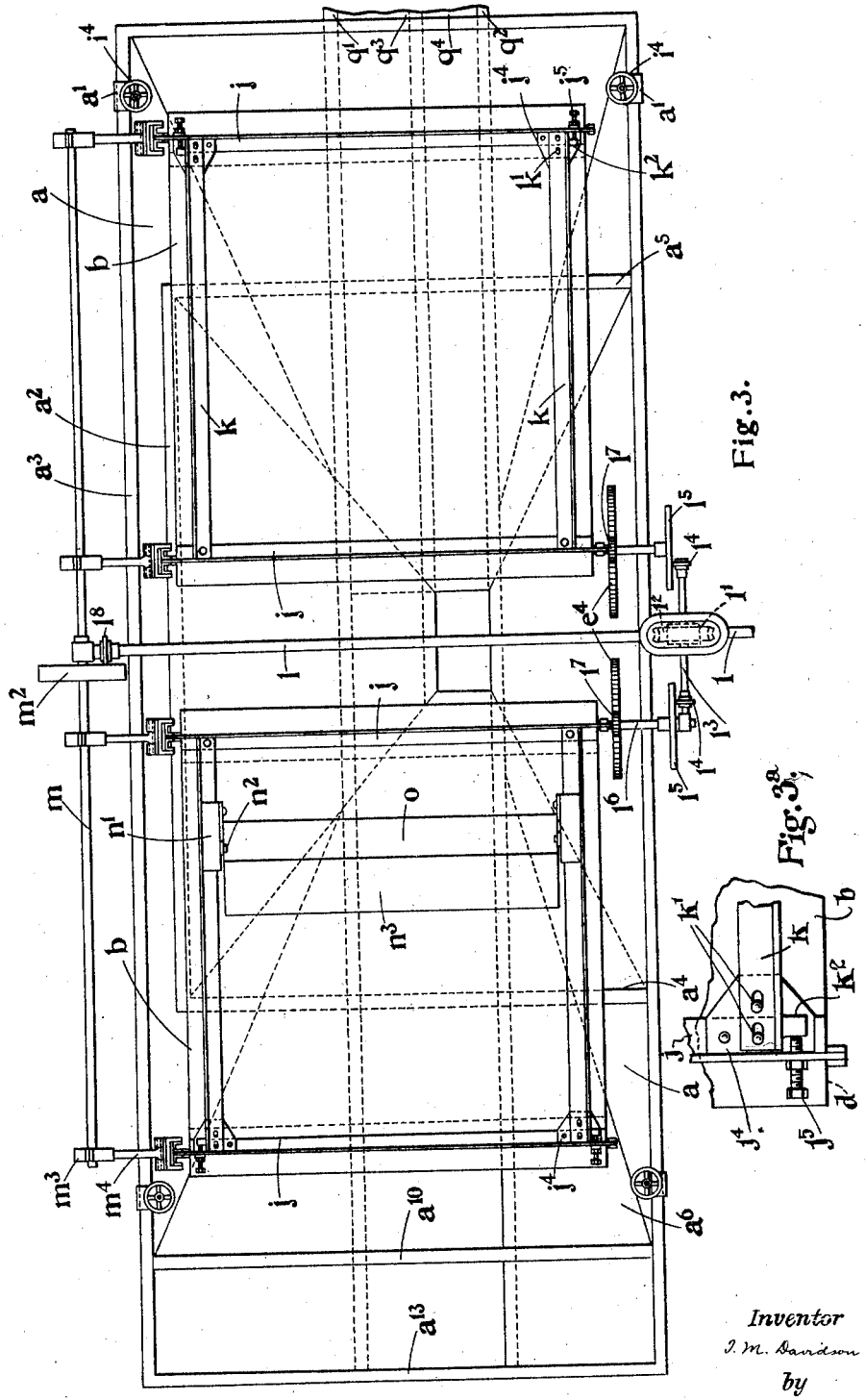
Figure 3 is a plan view.

Figure 3ª is an enlarged detail plan view of the means employed for carrying the length of the endless conveyor.

Figure 4:
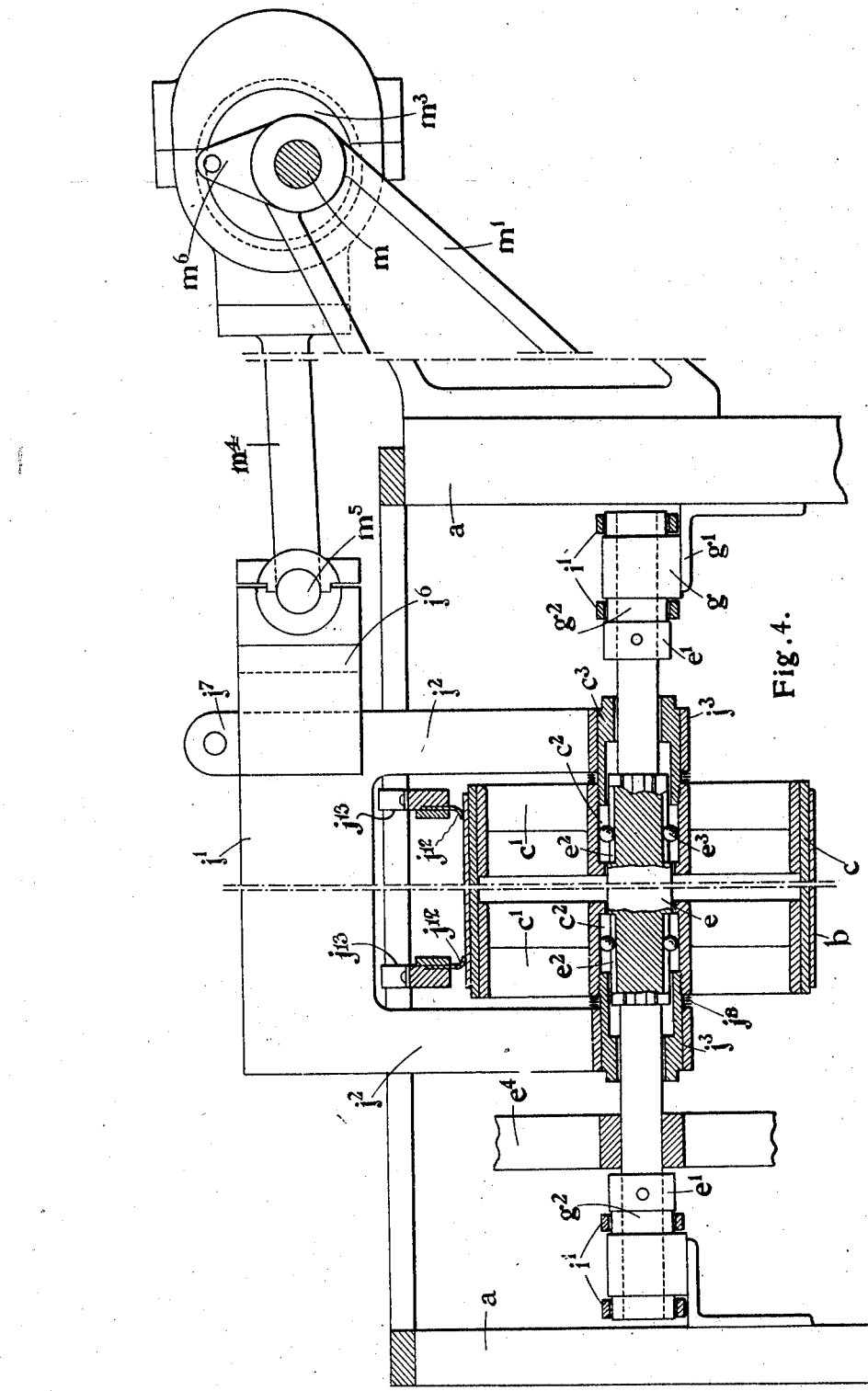

Figure 4 is a longitudinal sectional view, to an enlarged scale, of the upper roller of one of the endless belt conveyors, and shows also the frame effecting reciprocation of the rollers and the eccentric therefor.

Figure 5 is a detail sectional view, to the enlarged scale, of the mounting for the lower roller.

Figure 6 is a sectional view, to the enlarged scale, of the upper roller, taken through a bearing thereof.

Figure 7 is a sectional view, to the enlarged scale, of the lower roller, taken through a bearing thereof.

Figure 8 is a detail sectional view illustrating the use of a discharge conveyor specially adapted to deal with slimes.

Figure 9:
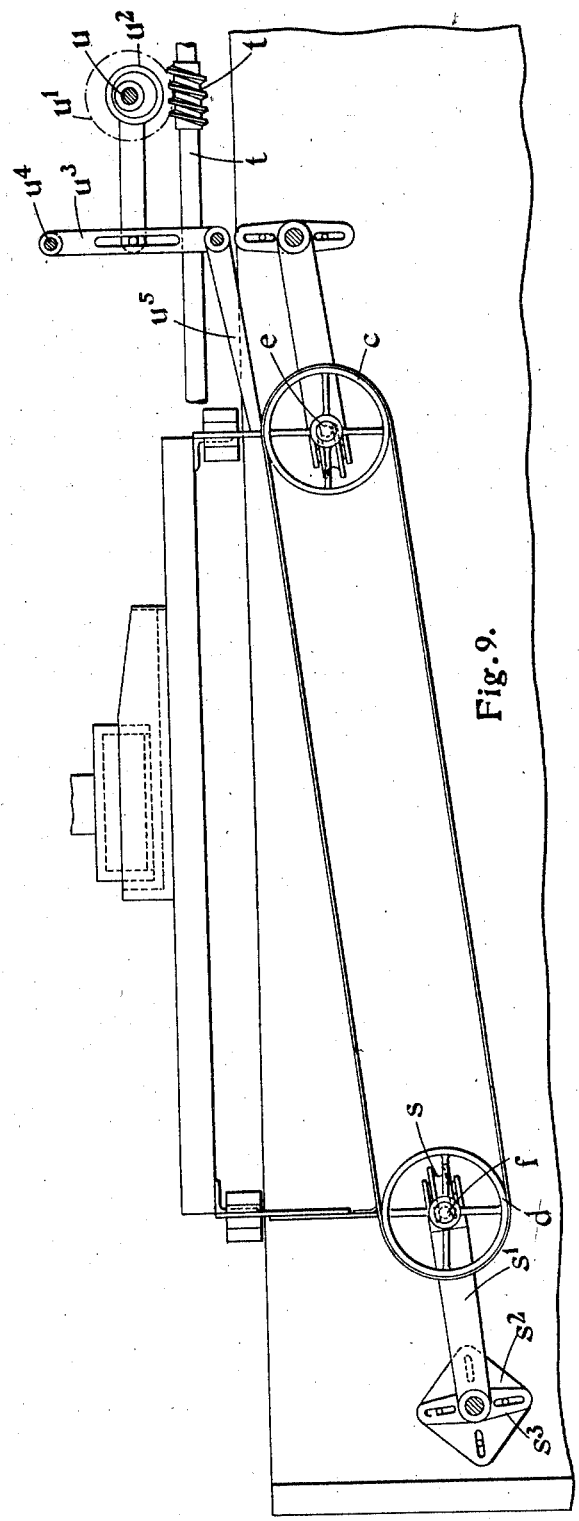
Figure 10:
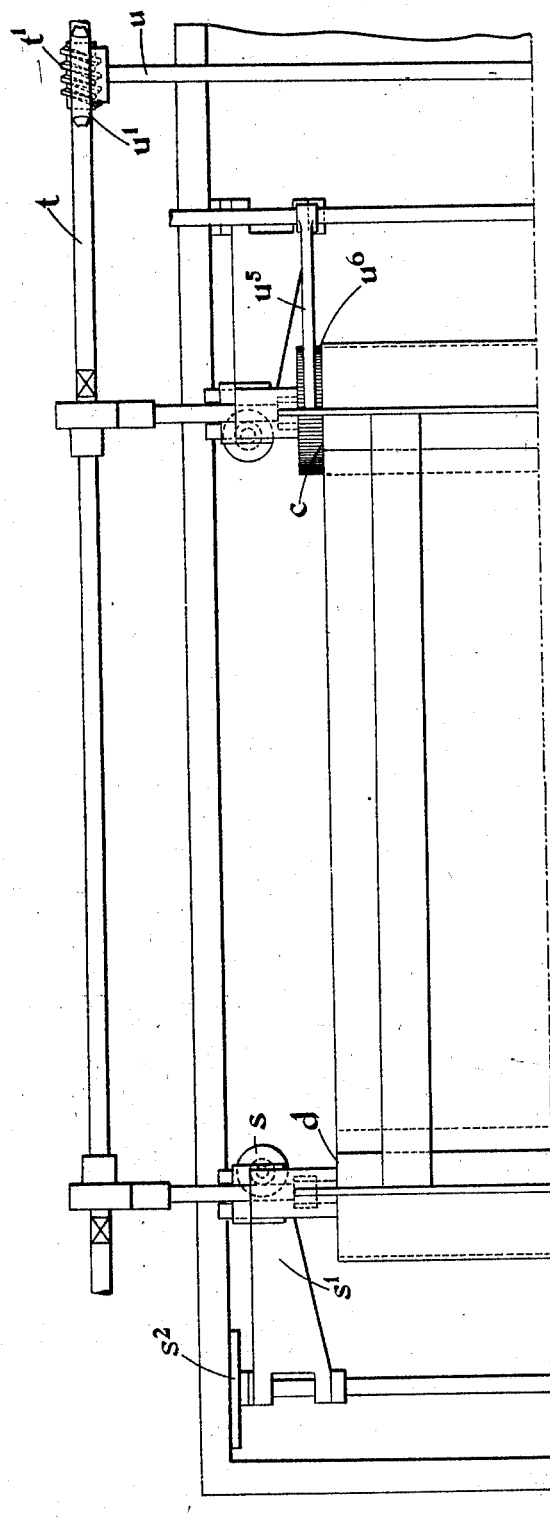
Figure 11:
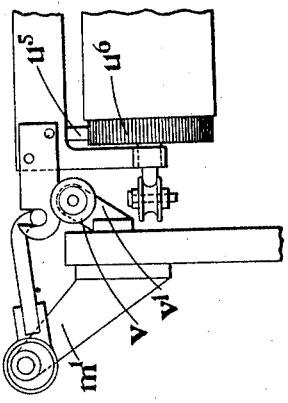

Figures 9, 10 and 11 are respectively a side elevation, a part plan, and a detail view, of a modified construction of the apparatus.

In carrying the invention into effect in the construction of an apparatus as shown in the drawings, a tank $a$ is provided which conveniently approximates in form to an inverted pyramid but has the upper side walls disposed vertically to adapt them to receive the bearings or supports for the endless conveyors, of which two are provided.

Each conveyor comprises an endless belt $b$ passing around upper and lower rollers $c$, $d$, the upper rollers of the two conveyors being mounted in juxtaposed positions. In each case the shaft $e$ of the upper roller is rotatably supported at each end in a bearing $g$ carried by an angle bracket $g^1$, mounted on the vertical upper side wall of the tank, and adapted, if necessary, for adjustment of position for variation of the elevation of the shaft. Longitudinal movement of the shaft is prevented by means of collars $e^1$.

The shaft $f$ of the lower roller $d$ is supported and advantageously fixed at each end in a bearing block $h$ of rectangular shape and having a groove formed in each of the upper and lower surfaces, transversely to the axis, for engagement with correspondingly formed slide bars $h^1$ provided upon an open frame or fitting $h^2$ secured to one end of a tie bar $i$ the other end of which is pivotally fitted upon the bearing $g$. For this purpose the end of the tie bar $i$ is formed into an eye or sleeve $i^1$ and a second eye or sleeve $i^1$ is formed in a short cranked bar-fitting riveted or bolted to the tie bar. The eyes or sleeves $i^1$ embrace corresponding bosses $g^2$ upon the bearing $g$.

For variation of the tension of the belt $b$, the bearing blocks $h$ are adjusted along the slide bars $h^1$ by means of screwed spindles $h^3$ carried by them and passing through lugs $h^4$ formed upon the frames or fittings $h^2$ for engagement with adjusting nuts $h^5$. For adjustment of the inclination of the belt the tie bars $i$ are provided at the free ends with lugs $i^2$ to which are pivoted screwed spindles $i^3$ adapted to slide through supporting brackets $a^1$ mounted upon the walls of the tank and to be engaged by adjusting nuts $i^4$. By such means the inclination of the belt may be varied as desired, for instance, over a range of say 10°.

The rollers $c$, $d$, are adapted to have axial movement upon their respective shafts to a limited degree, and for this purpose the upper roller $c$ is provided with spiders $c^1$ the bore of each of which is somewhat larger in diameter than the shaft and formed with a number of longitudinal recesses $c^2$, which may be of rectangular cross section, extending from the outer end partly through the bore. The shaft is formed with corresponding recesses $e^2$ and balls $e^3$ are seated partly within the recesses $c^2$ and partly in the recesses $e^2$, thus serving to support the roller upon the shaft in such manner that while the roller is free to move axially to the extent permitted by the length of the recesses, the rotation of the shaft is communicated to to the roller. The outer end of the bore of the spider $c^1$ is closed by an annular cap $c^1$ screwing into a screw-threaded part of the bore so that the cap, when in position, serves to confine the balls $e^3$ within the recesses $c^2$, $e^2$.

The lower roller $d$ is similarly provided with spiders $d^1$ each having a bore which is somewhat larger in diameter than the shaft $f$ and formed with longitudinal recesses $d^2$ for the reception of the balls $f^1$. The shaft $f$ is not recessed to receive the balls but is formed with a portion $f^2$ of reduced diameter upon which they may bear, so that the spider is rotatably carried upon the shaft, and may also move axially. As in the case of the upper roller, caps $d^3$ are provided for closing the recesses $d^2$ and for retaining the balls $f^1$ therein.

The belt, which may be of rubber or any other suitable material, is made endless and passes direct from one roller to the other.

For the transverse reciprocation of the endless belt there is provided, for each conveyor, a frame comprising two transverse members $j$ disposed above and parallel with the axes of the respective upper and lower rollers $c$, $d$, and two longitudinal members $k$ connecting the transverse members. The members $j$ and $k$ may be of angle, channel or other section metal or of wood. The transverse members have secured to them longitudinal plate members $j^1$ each provided at each end with a downwardly extending arm $j^2$ having at its lower end a sleeve $j^3$, which is adapted to embrace the cylindrical exterior surface of the corresponding cap $c^3$ or $d^3$ of the roller, and thus, to support the frame thereon. Cushioning springs $j^5$ are advantageously interposed between the sleeves $j^3$ and the spiders $c^1$, $d^1$. The arms $j^2$ of the plate member disposed above the lower roller $d$ are provided in two parts which may be adjusted relatively one to the other by means of a pin, nut and slot connection $j^9$ to follow the adjustments made in respect of the shaft bearings for variation of the inclination of the belt. The two parts of the respective arms may be secured together in any suitable manner, as by means of slots and bolts.

In order that the frame may be adjusted to compensate for variation in the length of the belt, the transverse member $j$ above the roller $d$ is connected to the longitudinal members $k$ by means of web plates $j^4$ carrying bolts which pass through longitudinally disposed slots $k^1$ in the members $k$. The relative position is determined by means of abutments or lugs $k^2$ and adjusting screws $j^5$ passing through screwed blocks secured to the plate member $j^1$.

The forward movement and the transverse reciprocation of the belts are effected from a main driving shaft $l$ which is disposed above and transversely to the tank $a$ midway between the two conveyors.

For the forward movement of the belts there is provided on the shaft $l$ a worm $l^1$ which engages a worm wheel $l^2$ fixedly mounted upon a shaft $l^3$ upon which are slidably mounted friction wheels $l^4$ adapted respectively to drive friction discs $l^5$. The latter are respectively mounted upon countershafts $l^6$ which carry pinions $l^7$ adapted to engage spur wheels $e^4$ mounted fixedly upon the shafts $e$ of the rollers $c$.

The speed of the forward movement of each belt may be readily varied and regulated by adjustment of the corresponding friction wheel $l^4$ along the shaft $l^3$ so that the speed of rotation of the counter-shaft $l^6$ is increased or decreased.

For the transverse reciprocation of the belts, a shaft $m$ is carried in brackets $m^1$ secured to one of the side walls of the tank at the upper edge on the outer side and so that the shaft is disposed on the level of the plate members $j^1$. The shaft $m$ is rotated from the driving shaft $l$ by a friction wheel $l^8$ slidably mounted upon the shaft $l$ and engaging a friction disc $m^2$ secured to the shaft $m$ so that the speed of rotation of the shaft $m$ may be readily varied. Opposite each of the plate members $j^1$ the shaft $m$ is fitted with an eccentric $m^3$, the rod $m^4$ of which is pivotally connected to the adjacent end of the oppositely disposed plate member. The connection is conveniently made by means of a transverse axis or pivot pin $m^5$ upon the rod $m^4$ engaging a bearing bracket $j^6$ secured to the plate member $j^1$ so that the pin $m^5$ is in the same horizontal plane as the shaft $m$. The bearing bracket $j^6$, in the construction illustrated, is formed with a channel-shaped base or body portion, which embraces and is secured to two short lengths of channel section metal vertically disposed one on each side of the plate member $j^1$ and secured thereto. In order to avoid uneven movements and shock and to take up wear a lug $j^7$ on the plate member $j^1$ is connected by a spring $m^7$ with a lug $m^6$ on the adjacent bearing bracket $m^1$.

The material to be separated is fed from a supply hopper or feed box $n$ to an inclined shoot $o$, the lower end of which is immersed in the water or other liquid and reaches the proximity of the supporting or upper surface of the belt at a point which is sufficiently below the surface level of the water or other liquid, that the material is delivered to the belt at a point where the water or other liquid is undisturbed. The shoot, which is conveniently of a width somewhat less than that of the belt, may, as shown in the drawing, be carried by the roller frame so that it partakes of the transverse reciprocation to which the frame and the rollers are subjected. For this purpose it may be supported upon the longitudinal members $k$ by such means as brackets $n^1$ to which it is secured or upon which it is supported by bolts or pins $n^2$ in such manner that the inclination may be varied as desired.

The material delivered to the endless belt from the shoot is separated as the result of the forward movement and transverse reciprocation of the belt. Thus, in the case of coal, the heavy impurities are deposited upon the belt surface and remain thereon, being carried upwardly and discharged over the upper roller, while the coal, as the result of the lateral reciprocation of the belt, is maintained in movement and passes downwardly for delivery over the lower roller.

It is advantageous to provide transverse aprons or strips of rubber $j^{10}$ to bear upon the belt immediately over the lower rollers $d$ and thus, to ensure that the lighter substances accumulate against the apron and finally discharge over the upper edge of the apron $j^{10}$. The aprons may conveniently be carried by supporting bars $j^{11}$ secured to the arms $j^2$ of the roller frame or to the plate members $j^1$. Similarly it is advantageous to provide lateral aprons of rubber $j^{12}$ to bear upon the edges of the supporting or upper surface of the belt $b$. Such aprons $j^{12}$ may be carried by longitudinally disposed bars or supports $j^{13}$ mounted on or supported from the side walls of the tank $a$.

When the material to be separated is of a light character, such as zinc slime, there is a tendency for particles to float upon the surface of the water or other liquid. It is desirable, therefore, that baffle plates $p$, should be disposed transversely in the tank across the portion of the tank above the lower end of the supporting or upper surface of the belt. Certain of the baffles may be submerged in the water or other liquid with their lower edges disposed at a distance of, for example, one quarter of an inch from the supporting or upper surface of the belt, while the intermediate baffles may project above the level of the water or other liquid and have their lower edges disposed so that they are lower than the upper edges of the submerged baffles. The floating particles collect against such baffle plates and in time sink on to the belt. It is further desirable, with certain light materials, to provide the shoot of closed form, or to fit over the lower end, which is immersed in the water or other liquid, a shield or cover, such as $n^3$.

For the collection of the separated material, the tank is provided with an inner chamber formed by a partition $a^2$ which extends parallel to one of the side walls $a^3$ of the tank and by end walls $a^4$, $a^5$, the upper portions of which are disposed at an inclination corresponding in angle with that of the adjacent end wall $a^6$, $a^7$ of the tank while the lower portions of the said walls are disposed vertically. Thus, the lower portion of the chamber is substantially triangular in the transverse section and rectangular in the longitudinal section. A casing $q$ is provided to extend upwardly along the inclined wall $a^7$ of the tank and is divided into two longitudinal compartments $q^1$, $q^2$, each of which serves to receive an elevator or a conveyor, such as $q^3$, $q^4$, the two conveyors having the same shaft axes. The one compartment $q^2$ is, at the lower end, connected with the chamber in the tank by way of a port formed at the lower end of the chamber at the junction of the end walls $a^6$, $a^7$, of the tank. The upper open end of the chamber extends in each direction from the middle of the tank sufficiently to ensure that the upper rollers $c$ of the two endless conveyors may deliver the heavier material thereto and thus the heavier material passes downwardly through the chamber to the corresponding elevator or conveyor $q^4$. The lighter material, which is delivered over the lower rollers $d$ passes down along the inclined end walls $a^6$, $a^7$, of the tank, and enters the second compartment $q^1$ of the casing $q$ whence it is lifted by the second elevator or conveyor $q^3$. At the upper end of the conveyor casing there may be provided an adjustable weir member $a^{16}$ by which the level of water or other liquid within the tank may be determined.

In the case of materials such as zinc slimes, it is desirable to permit the separated constituents, more particularly the lighter constituent, to accumulate in the bottom of the tank and to pass away through the elevator casing $q$ merely by overflowing under the assistance of a screw or paddle elevator or agitator such as is illustrated in Fig. 8. This device comprises a longitudinally disposed shaft $r$ provided at intervals with propeller blades $r^1$. It is further desirable to provide a draw off opening or outlet $a^{17}$ for the separated constituents at the lower end of the casing $q$. This is specially desirable in the treatment of minerals, giving heavy concentrates.

In view of the possibility of the water or other liquid within the tank becoming fouled by the presence of fine particles of the material under separation, means are conveniently provided to secure the deposit of this material within the tank and to remove the water after the separation of the material. For this purpose one inclined end wall $a^6$ of the tank is provided with an opening $a^8$ at the lower end adjacent the casing $q$ and a second wall or partition $a^9$ parallel with the wall $a^6$, is provided to extend upwardly to within a short distance of the upper end of the inclined wall $a^6$ of the tank. From the upper end of the said wall of the tank there is further provided a vertical partition $a^{10}$ extending downwardly to within a short distance of the horizontal bottom $a^{11}$ of an extension $a^{12}$ of the tank, while a further vertical wall $a^{13}$ is provided exterior to the said partition to extend upwardly to the upper edge of the tank, and, at a point near the water level, the extension of the tank is provided with an over-flow or outlet $a^{14}$ by which the water may be drawn and returned to the main body of the tank and which may serve as a weir to determine the water level in the tank.

By the means described, and by the slow flow of water along the passages between the walls and partitions $a^6$, $a^9$, $a^{10}$ and $a^{13}$ of the tank and the extension of the tank, the floating particles of the material are caused to be deposited adjacent the inlet to the compartment $q^1$ and the water, freed of the floating particles, finally passes away by the overflow or outlet $a^4$ whence it may be returned by a pump to the tank $a$. A drain cock $a^{15}$ is conveniently provided near or at the bottom of the extension $a^{12}$ of the tank adjacent the lower end of the downwardly extending vertical partition $a^{10}$.

Figure 1:
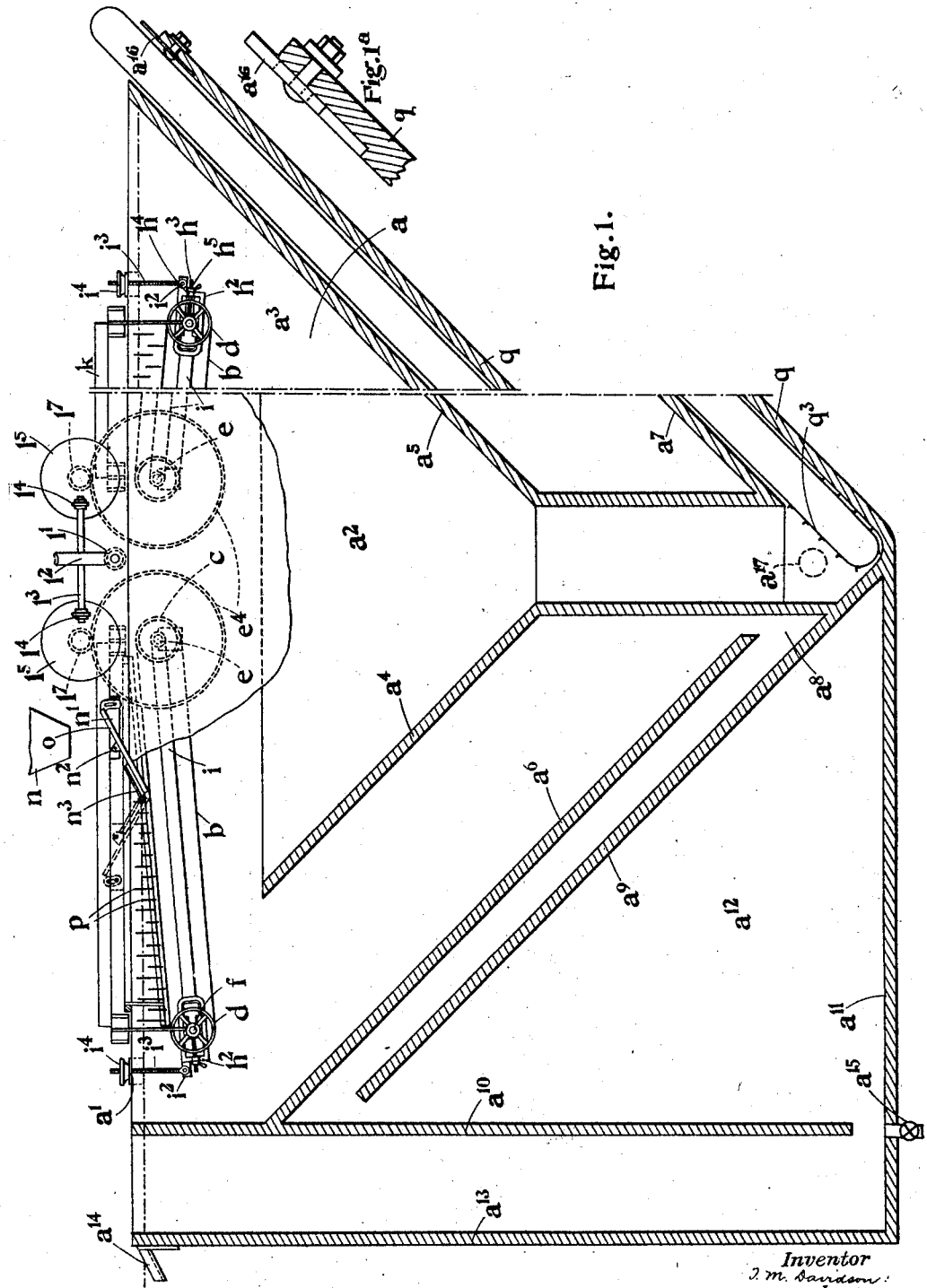
Figure 2:
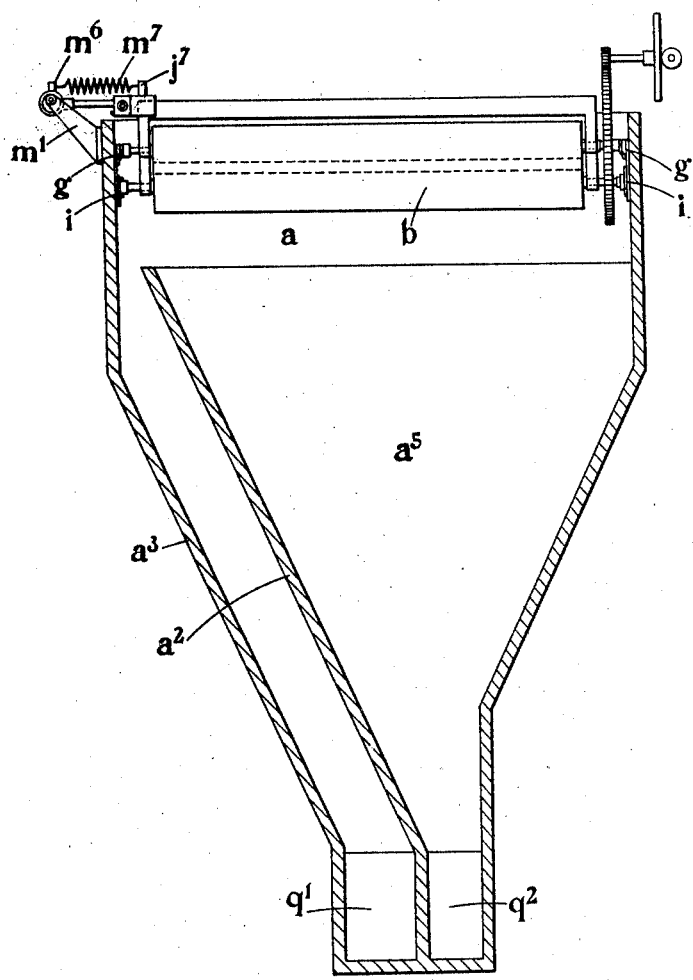
Figure 2 is a cross-sectional view.

It will be understood that the invention is not limited to the use of the apparatus such as that hereinbefore described. Thus, a shoot of fixed position may be used and may be supported at the desired inclination from the walls of the tank for example, by such means as a metal strap, or a suitable hopper or feed device may deliver the substance under treatment directly to the belt. Again, the inclination of the shoot may be opposite to that of the corresponding belt as shown in dotted lines in Figure 1. Again, where it is unnecessary or undesirable to use the roller bearings, such as hereinbefore described, for mounting the rollers upon their respective shafts, the modified construction illustrated diagrammatically in Figures 9, 10 and 11, may be adopted in which the rollers $c$, $d$, are fixed to their shafts $e$, $f$ which are supported by means of grooved wheels $s$ mounted upon tie members $s^1$ or brackets, carried from the walls of the tank and adjustable in position for variation of the inclination and the tension of the belt.

Thus the bracket provided in respect of the lower roller $d$ is formed in two parts, one of which $s^2$ is mounted on the wall of the tank by means of bolts passing through slots formed in the said part approximately in the direction parallel to the plane of the conveyor, so that by adjustment of the bracket part upon the said bolts the tension of the belt may be varied, while the second part $s^3$ of the bracket is mounted upon the first part by means of bolts thereon which engage slots formed approximately in the vertical direction in the second part of the bracket, so that, according to the position of the bolts within the slots, the inclination of the supporting or upper surface of the belt may be varied.

The forward movement and the transverse reciprocation of the belt are effected from the main driving shaft $t$ which is supported in the bearing brackets $m^1$.

To effect the forward movement of the belt the driving shaft $t$ is provided with a worm $t^1$ driving a worm wheel $w^1$ mounted upon a transversely disposed counter-shaft $u$ carrying eccentrics $u^2$, the rods of which serve to effect oscillation of pendant arms $u^3$ mounted upon a shaft $u^4$ in fixed position. The said arms, at the lower end, are pivotally connected to ratchet pawls $u^5$, which engage ratchet wheels $u^6$ formed upon or secured to the upper roller. Thus, in the oscillation of the arms produced by the eccentrics which are set at 180°, the ratchet pawls rotate the upper roller continuously.

The frame by which the transverse movement of the rollers is effected is supported by grooved wheels $v$ with horizontally disposed axes carried by brackets $v^1$ secured to the walls of the tank.

Again, in the use of variable speed gearings of the friction roller and disc type, as hereinbefore described, reducing gear may be employed to transmit the drives to one or both of the friction gears or between the friction gears and the shafts with which they are respectively connected.

It will further be understood that the treatment of the substances to be separated or washed may be effected in a number of stages by the use of sets of laterally reciprocating endless conveyors, that is to say, the material discharged at each end of the first conveyor may be further separated in the use of a conveyor laterally reciprocated in the manner described and set into such an inclined position that the material discharged at the respective ends of the first conveyor may be further separated according to the specific gravity of the constituents.

I claim:

1. Apparatus for the treatment of minerals and other substances for washing and separation, comprising an endless stratifying conveyor whose upper surface is inclined and adapted for the separation and discharge therefrom of the respective coarse and finely divided particles in opposite directions, a tank within which the said conveyor is disposed, the said tank being adapted to be filled with liquid to a level such that the conveyor is immersed, means for reciprocating the conveyor in a direction transverse to its upper surface, means for moving the upper surface of the conveyor in an upward direction, means for feeding to the conveyor the substance to be treated at a position where it is adapted to be immersed in the liquid contained in the tank and where the liquid is in a substantially undisturbed condition, comprising an inclined separating shoot having its lower part immersed in the liquid contained in the tank, the said inclined separating shoot being subject to the same transverse reciprocation as the conveyor, substantially as described.

2. Apparatus for the treatment of minerals and other substances for washing and separation, comprising an endless stratifying conveyor whose upper surface is inclined and adapted for the separation and discharge therefrom of the respective coarse and finely divided particles in opposite directions, a tank within which the said conveyor is disposed, the said tank being adapted to be filled with liquid to a level such that the conveyor is immersed, means for reciprocating the conveyor in a direction transverse to its upper surface, means for moving the upper surface of the conveyor in an upward direction, means for feeding to the conveyor the substance to be treated at a position where it is adapted to be immersed in the liquid contained in the tank and where the liquid is in a substantially undisturbed condition, comprising an inclined separating shoot inclined downwardly in the same direction as the upper surface of the conveyor, and having its lower part immersed in the liquid contained in the tank and its lower edge directed towards the lower end of the said conveyor, the said inclined separating shoot being subject to the same transverse reciprocation as the conveyor, substantially as described.

3. Apparatus for the treatment of minerals and other substances for washing and separation, comprising an endless stratifying conveyor whose upper surface is inclined and adapted for the separation and discharge therefrom of the respective coarse and finely divided particles in opposite directions, a tank within which the said conveyor is disposed, the said tank being adapted to be filled with liquid to a level such that the conveyor is immersed, means for reciprocating the conveyor in a direction transverse to its upper surface, means for moving the upper surface of the conveyor in an upward direction, means for feeding to the conveyor the substance to be treated at a position where it is adapted to be immersed in the liquid contained in the tank and where the liquid is in a substantially undisturbed condition, upstanding baffles disposed in transverse spaced positions above but not upon the upper surface of the conveyor and means for the support of the said baffles, substantially as described.

4. Apparatus for the treatment of minerals and other substances for washing and separation, comprising an endless conveyor whose upper surface is inclined, a tank within which the said conveyor is disposed, the said tank being adapted to be filled with liquid to a level such that the conveyor is immersed, means for reciprocating the conveyor in a direction transverse to its upper surface, means for moving the upper surface of the conveyor in an upward direction, means for feeding to the conveyor the substance to be treated at a position where it is adapted to be immersed in the liquid contained in the tank and where the liquid is in a substantially undisturbed condition, and upstanding baffles disposed in transverse positions above the upper surface of the conveyor, some of said baffles being wholly immersed in the liquid and some being partly immersed and projecting above the level of the liquid in the tank, substantially as described.

5. Apparatus for the treatment of minerals and other substances for washing and separation, comprising an endless conveyor whose upper surface is inclined, a tank within which the said conveyor is disposed, the said tank being adapted to be filled with liquid to a level such that the conveyor is immersed, means for reciprocating the conveyor in a direction transverse to its upper surface, means for moving the upper surface of the conveyor in an upward direction, means for feeding to the conveyor the substance to be treated at a position where it is adapted to be immersed in the liquid contained in the tank and where the liquid is in a substantially undisturbed condition, and baffles disposed in transverse positions above the upper surface of the conveyor, alternate baffles being completely submerged in the liquid contained in the tank and the others being immersed and projecting above the level thereof, substantially as described.

6. Apparatus for the treatment of minerals and other substances for washing and separation according to claim 1, in which the means for reciprocating the endless conveyor comprise rollers upon which the said conveyor is supported, and shafts upon which the said rollers are axially moved, substantially as described.

7. Apparatus for the treatment of minerals and other substances for washing and separation according to claim 1, in which the means for reciprocating the endless conveyor comprise rollers upon which the said conveyor is supported, shafts upon which the said rollers are axially moved, and frame parts through which the reciprocation is imparted to the said rollers and to the said conveyor, substantially as described.

THOMAS MALCOLM DAVIDSON.